Figure 1:
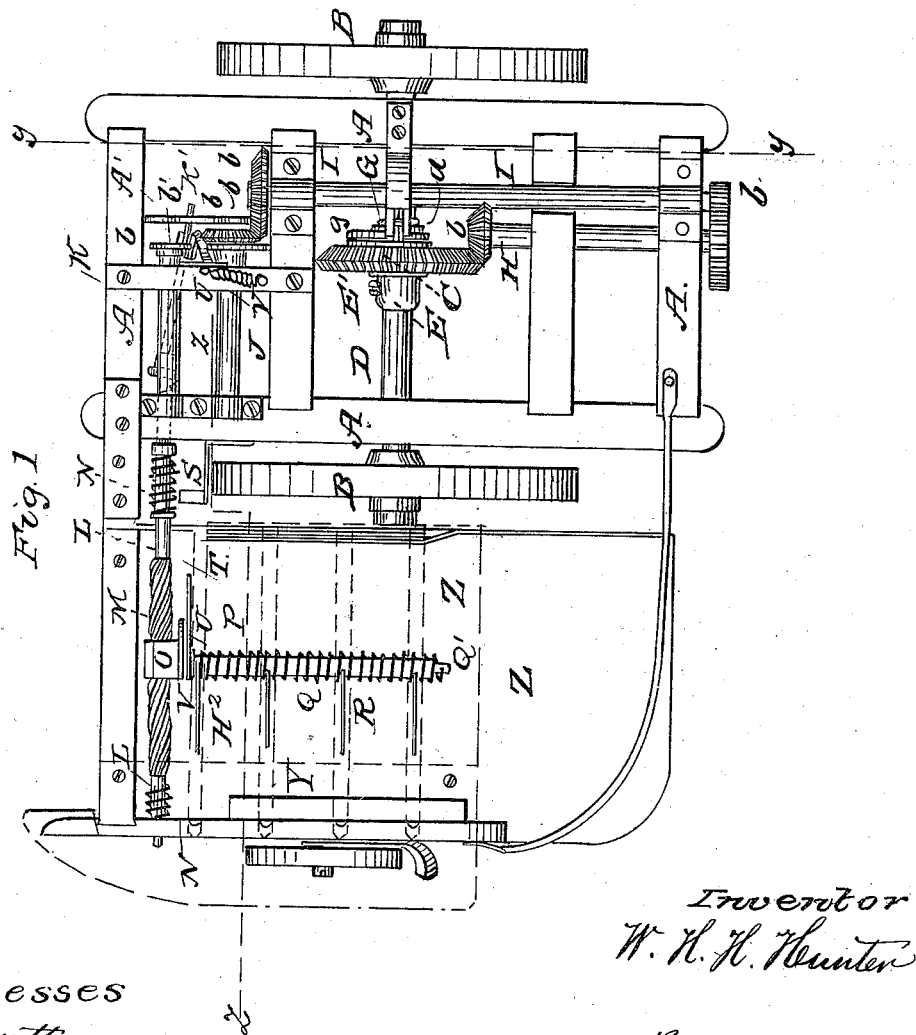

W. H. H. HUNTER.
Harvester Rake.

No. 42,488.      2 Sheets—Sheet 1.

Patented April 26, 1864.

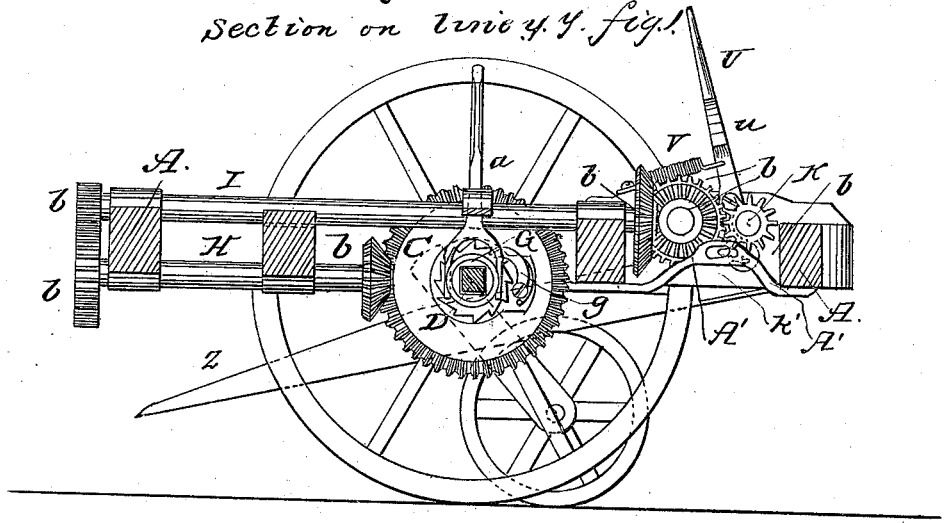

UNITED STATES PATENT OFFICE.

WM. H. H. HUNTER, OF VERSAILLES, INDIANA.

IMPROVEMENT IN RAKES FOR HARVESTERS.

Specification forming part of Letters Patent No. 42,488, dated April 26, 1864.

*To all whom it may concern:*

Be it known that I, WM. H. H. HUNTER, of Versailles, in the county of Ripley and State of Indiana, have invented a new and useful Improvement in Automatic Rakes for Harvesting-Machines; and I do hereby declare that the following is a full and exact description thereof, reference being had to the accompanying drawings, and to the letters of reference marked thereon.

Figure I represents a reaping-machine with my improvements attached. Fig. II is a sectional view through lines $y\,y$ of Fig. I. Fig. III is a sectional view of raking attachment through line $z\,z$, Fig. I; Fig. IV, sectional view through line $v\,v$, Fig. I.

My invention relates to an improved mechanism for operating the rake of harvesting-machines; and my invention consists in the construction and adaptation of a screw for traversing the rake, operated through the means of a toggle-joint shaft, and shipping-lever and suitable gearing whereby the rake may be controlled by the attendant riding upon the machine.

In the drawings, A represents the main frame of a harvesting-machine.

B B are the driving-wheels, which support the machine.

C is the large bevel-gear, arranged centrally upon the main shaft D.

E is an adjustable collar on main shaft D, provided with set-screw E'.

G is a ratchet-collar upon the square portion of shaft D.

$g$ is a spring-pawl pivoted to the face of bevel-gear C.

$a$ is a shipping-lever by which the machine is thrown in and out of gear.

Bevel-gear C operates the rake through the medium of shafts H, I, J, and K and their gearing $b\,b\,b\,b\,b\,b$.

L is the main rake-shaft, upon which the screw M is fixed or cut.

N N are spiral springs upon the screw-shaft L.

O is the nut through which screw M passes, and to the nut O the rake-head P is socketed, so as to revolve upon its axis when in operation.

Q is a spiral spring on the rake-head; R, rake-teeth.

S is an inclined or beveled detent, attached to the frame, and under which the end of catch-lever T passes when the gavel is being discharged. The lever T is furnished with a spring and catch, and is pivoted at $i$ to a projecting portion of nut O. Rake-tooth $R^2$ is provided with a stop which projects from its rear side, as seen at $x$, where the tooth $R^2$ is detached from the rake-head. Under Fig. I is represented the spring-catch lever T' detached, and a sectional view of the hollow rake-head, with a notch into which the catch of lever T works. Under Fig. II is a side view of slotted rest A', which supports the adjustable auxiliary shaft K'. The spiral spring V detracts stirrup-lever U. $u$ denotes the stirrup. The lower end of lever U embraces auxiliary shaft K' near its long spur-gear $b'$. The auxiliary shaft K' is arranged below the gear-shafts J K, so as to permit a free adjustment of said shaft laterally in its slotted rest A', for the purpose presently described. The auxiliary shaft, with its spur-gear $b'$ and the stirrup-lever U, are represented in red ink in the drawings. The rake-teeth are rigidly fastened to a tubular head surrounding the socket-rod $o'$, which is screwed unto nut O.

W is the gaveling-space; and Y is an inclined flange, against which the rear curved portions of the rake-teeth strike when the rake is reaching the outer edge of the platform, and by which the rake-teeth are caused to assume a vertical position, ready for gathering the next gavel. The rake-head, screw, and nut O are arranged between the platforms Z and Z', the latter being slotted for the rake-teeth to work in discharging the gavel.

Having now described the construction and arrangement of the mechanism which I have employed to carry into effect the principle involved in my invention, I will proceed to describe the manner of operating the same. Motion is communicated from the driving-wheels B B to the large and small gear-wheels $b\,b$ on the shafts J K, thence from either of said gear-wheels, at the option of the attendant, to the auxiliary shaft K', which is connected by toggle-joint to the screw-shaft L and screw M. The attendant upon the machine may reverse the direction of motion of the shafts and rake-screw M at any interval of time necessary to gather a gavel by means of the stirrup-lever U, which adjusts the long spur-gear $b'$, so as to bring it in mesh with either of the gear-wheels, beneath which it is arranged. Although the driver may hold the spur-gear $b'$ wholly out of gear with either of the wheels with which it works, yet this is rendered unnecessary during the interval while a sufficient amount of grain is accumulating upon the platform to form a gavel, because of the provision which I have made of wrists upon the screw-shaft at each end of the screw. These wrists are provided with spiral springs N N. The spiral spring V holds the lever U (when not thrown forward by the hand or foot of the attendant) backward, thus causing the gear b' to mesh with the small pinion on shaft K. Shaft K, with its gear, will cause the screw to revolve forward, and it in turn will cause the nut O, with the rake-head, to move outward to the grain side of the platform, when the nut O is thrown upon the wrist of the screw-shaft, causing the spiral spring thereon to be compressed, and the rake will remain at rest until the attendant, by means of his foot in the stirrup u of lever U, throws forward the upper end of the lever, causing the spur-gear on shaft K' to come into action with the large gear-wheel on shaft J. Thus the motion of the screw is reversed and the rake is made to traverse the platform, gathering a gavel and carrying it to the gavel-space W, where it is discharged. When the rake has reached that side of the platform at which the gavel is discharged the tail of the curved spring-catch lever T' T slides under the inclined detent S, which throws the catch of the lever out of the notch 2 of the rake-head, when the spiral spring Q thereon causes the tubular rake-head to perform a quarter-revolution, thus throwing down the rake-teeth beneath the platform Z'. When the rake-teeth are raised to a vertical position by the inclined flange Y, against which the curved portions of the teeth strike, the catch of lever T is thrown into notch 2, thus holding, by means of spring 3, the rake in proper position to rake off a gavel. While the nut O is at rest on the wrists at either end of the screw M, and before the motion of the screw is reversed, the spiral springs N remain compressed, although the screw, with the shafts K' and L, may continue to revolve; but when the attendant ships shaft K' so as to change the direction of the revolving motion of the screw M, then the spiral springs N cause the nut O to be thrust upon the screw M, which causes it, with the rake, to traverse the platform.

It is evident that various modifications may be made in the details of the mechanism which I have employed. For instance, the toggle-joint shaft K' may be placed in direct line with the screw-shaft L, whereby the gearing of the spur-gear b' will mesh more evenly with the two gear-wheels on shafts J K. The screw M may be made with a less or greater degree of spiral coil; but the fact that the rake may be left at rest at either end of its traverse renders it unnecessary to determine the precise degree of spiral coil which may be given to the screw-thread. So, also, of the gearing, which may be so systematized as to traverse the rake at any desired speed. As the rake is passing out to the grain side of the platform the teeth are held in a horizontal position, the rest X holding the points of the teeth above the edge of flange Y, so that the flange causes the nut O to rise to a vertical position while the nut O is being forced outwardly by the screw M.

Having fully described my improvements in harvesting-machines, what I claim, and desire to secure by Letters Patent, is—

1. The combination of screw M and nut O with shafts L and K', connected by toggle-joint, in the manner and for the purpose herein described.

2. The combination of the wrists with their springs N N, nut O, and tubular rake-head P, arranged and operating with the mechanism for tilting the rake-teeth substantially as and for the purpose described.

3. The combination of the stirrup-lever U with the auxiliary shaft K', slotted rest A', gears b', and gear-wheels on shafts J K, arranged, connected, and operating as described, for the purpose set forth.

In testimony whereof I have, this 1st day of July, 1863, subscribed my name.

WM. H. H. HUNTER.

In presence of—
H. P. K. PECK,
JOSEPH LASHHORN.